United States Patent
Brothers et al.

(10) Patent No.: US 9,652,817 B2
(45) Date of Patent: May 16, 2017

(54) AUTOMATED COMPUTE KERNEL FUSION, RESIZING, AND INTERLEAVE

(71) Applicant: Samsung Electronics Co., Ltd., Suwon-si, Gyeonggi-do (KR)

(72) Inventors: John W. Brothers, Calistoga, CA (US); Santosh Abraham, Pleasanton, CA (US); Joohoon Lee, East Palo Alto, CA (US); Abhinav Golas, Mountain View, CA (US); Seonggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/656,074

(22) Filed: Mar. 12, 2015

(65) Prior Publication Data

US 2016/0267622 A1    Sep. 15, 2016

(51) Int. Cl.
| | |
|---|---|
| *G06K 9/40* | (2006.01) |
| *G06T 1/20* | (2006.01) |
| *G06T 1/60* | (2006.01) |
| *H04N 5/232* | (2006.01) |
| *H04N 5/235* | (2006.01) |
| *H04N 9/04* | (2006.01) |

(52) U.S. Cl.
CPC ............ *G06T 1/20* (2013.01); *G06T 1/60* (2013.01); *H04N 5/232* (2013.01); *H04N 5/2355* (2013.01); *H04N 9/045* (2013.01)

(58) Field of Classification Search
USPC ....... 382/100, 255, 224, 170, 159, 167, 168, 382/162, 266; 358/1.9, 3.06, 3.24; 600/587
See application file for complete search history.

(56) References Cited

U.S. PATENT DOCUMENTS

| | | | | |
|---|---|---|---|---|
| 6,950,210 | B2 * | 9/2005 | Guo | G06K 9/38 358/1.9 |
| 7,876,957 | B2 * | 1/2011 | Ovsiannikov | H04N 9/045 382/162 |
| 7,949,186 | B2 * | 5/2011 | Grauman | G06K 9/4671 382/159 |
| 8,271,996 | B1 | 9/2012 | Gould et al. | 719/312 |
| 8,572,595 | B1 | 10/2013 | Lethin et al. | 141/38 |
| 8,758,271 | B2 * | 6/2014 | Hunter | A01G 7/00 600/587 |
| 9,265,461 | B2 * | 2/2016 | Hunter | A61B 5/0053 |

(Continued)

OTHER PUBLICATIONS

Wu et al., "Kernel Weaver: Automatically Fusing Database Primitives for Efficient GPU Computation," MICRO-45 Proceedings of the 2012 45th Annual IEEE/ACM International Symposium on Microarchitecture, pp. 107-118, 2012.

*Primary Examiner* — Anh Do

(74) *Attorney, Agent, or Firm* — Lewis Roca Rothbarger Christie LLP (57) ABSTRACT

In a pipelined application having different stages of processing, such as a graphics application or an image processing application, there may be a dependence of one compute kernel upon another. Data associated with individual kernels needs to be written and read. A technique to minimize a need to read and write kernel data to external memory utilize at least one of fusing kernels, resizing workgroups, and performing interleaving of kernels.

18 Claims, 9 Drawing Sheets

(1 of 9 Drawing Sheet(s) Filed in Color)

(56) References Cited

U.S. PATENT DOCUMENTS

| | | | |
|---|---|---|---|
| 2005/0039167 A1 | 2/2005 | Fernandes et al. | 717/151 |
| 2006/0026578 A1 | 2/2006 | Ramchandran et al. | 717/106 |
| 2008/0098207 A1 | 4/2008 | Reid et al. | 717/141 |
| 2008/0098208 A1 | 4/2008 | Reid et al. | 717/159 |
| 2010/0070956 A1 | 3/2010 | Leung et al. | 717/143 |
| 2012/0291040 A1 | 11/2012 | Breternitz et al. | 718/100 |
| 2013/0091507 A1 | 4/2013 | Wu et al. | 718/104 |
| 2013/0111453 A1 | 5/2013 | Kalogeropulos et al. | 717/161 |
| 2013/0191852 A1 | 7/2013 | Howes et al. | 719/318 |
| 2013/0194286 A1 | 8/2013 | Bourd et al. | 345/545 |
| 2013/0222399 A1 | 8/2013 | Bourd et al. | 345/506 |
| 2013/0263100 A1 | 10/2013 | Mizrachi et al. | 717/140 |
| 2013/0332702 A1 | 12/2013 | Boudier | 345/522 |
| 2014/0267335 A1 | 9/2014 | Stoye | 345/545 |

\* cited by examiner

AUTOMATED COMPUTE KERNEL FUSION, RESIZING, AND INTERLEAVE

FIELD OF THE INVENTION

The present invention is generally related to the use of compute kernels in pipelined applications, such as graphics processing pipelines and image processing pipelines. More particularly, the present invention is directed to techniques to minimize a requirement to access off-chip memory resources in a pipelined application utilizing compute kernels.

BACKGROUND OF THE INVENTION

It is common for graphics processing applications and image processing applications to define a processing pipeline implemented with several compute kernels. In this context each compute kernel is typically a program applied to an array of threads.

In the OpenCL™ language a kernel is a function declared in a program. A work group is a collection of work items that executes on a single processor unit. The work items in a work group execute the same kernel and share memory resources, logically executed in parallel.

A pipeline may include a first stage of processing on an image followed by feeding the resulting image into the next processing stage. It is common for applications to be written so that one compute kernel processes the whole data set before the next computer kernel is run. That is, a first kernel performs a first stage of processing on an image and a second kernel performs a second stage of processing on an image. However, this normally requires accessing external memory because the data set sizes are typically too large to fit into on-chip caches or local memory. For a large data set, like a typical camera image or decoded frame of video, this means reading and writing all of the data for each kernel executed from the external memory (e.g., external dynamic random access memory). However, reading and writing all of the data for each kernel from the external memory consumes power and has other disadvantages associated with data traffic to the external memory.

SUMMARY OF THE INVENTION

An apparatus, system, and method are disclosed to reduce a need for compute kernels to access off-chip memory. Embodiments of the present invention include one or more of fusing compute kernels, interleaving compute kernels, and redefined work groups associated with kernels.

One embodiment of a method of performing a pipelined process utilizing compute kernels to perform stages of processing in a processing unit having a plurality of processors, an on-chip memory, and access to an external memory includes identifying dependencies between producer kernels and consumer kernels in a command queue. An interleaved set of dispatch calls is generated for at least one set of interdependent kernels in the command queue in which intermediate data results are maintained in the on-chip memory.

One embodiment of method of performing a pipelined process utilizes compute kernels to perform stages of processing in a processing unit having a plurality of processors, an on-chip memory, and access to an external memory. The method includes identifying dependencies between producer kernels and consumer kernels. A determination is made if pairs of kernels can be interleaved or fused. If fusion is performed at least two kernels are replaced with a fused kernel and the fused kernel is dispatched. If interleaving is performed an interleaved set of dispatch calls is dispatched for at least one set of interdependent kernels in which intermediate data results are maintained in the on-chip memory. In one embodiment a kernel dependency graph is generated defining a relationship between producer kernels and consumer kernels. In one embodiment work groups are redefined to match inputs and outputs of at least two kernels.

In one embodiment a system includes a graphics processing unit having a plurality of processors and an on-chip memory. A driver and a compiler are adapted to identify dependencies between producer kernels and consumer kernels associated with a graphics application, determine if pairs of kernels can be interleaved or fused; replace at least two kernels with a fused kernel and dispatch the fused kernel; and generate an interleaved set of dispatch calls for at least one set of interdependent kernels in which intermediate data results are maintained in the on-chip memory. In one embodiment the system is configured to redefine work groups associated with at least two kernels to match inputs and outputs of dependent kernels and maintain intermediate data results in on-chip memory.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
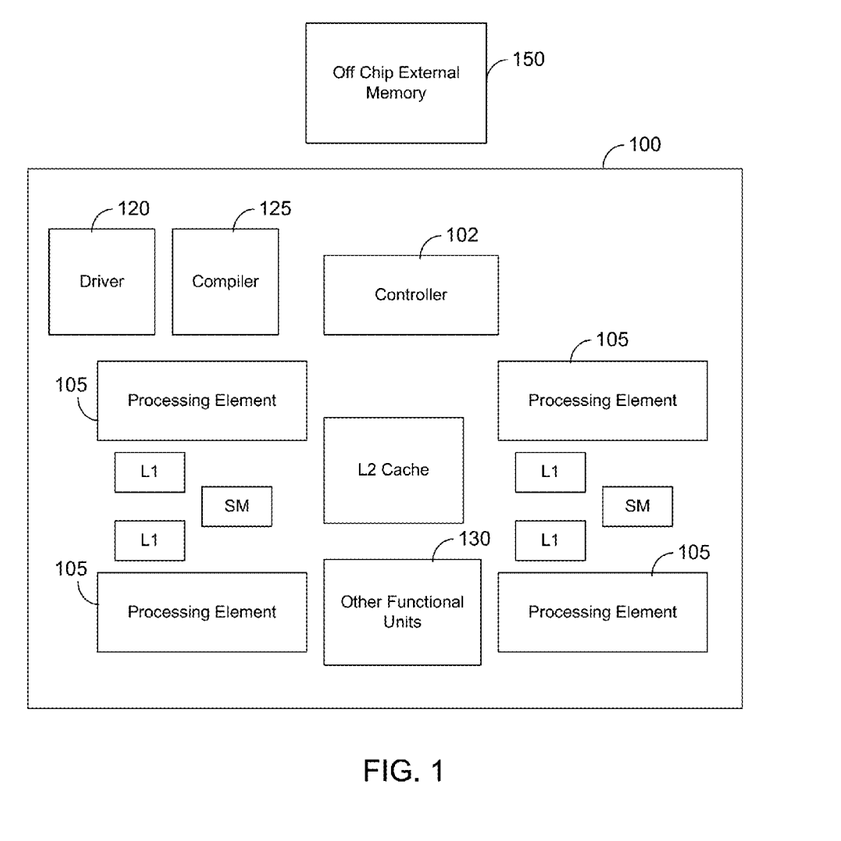
FIG. 1 illustrates a system environment for a pipelined application in accordance with an embodiment of the present invention.

FIG. 1 illustrates an exemplary system on a chip 100 in accordance with an embodiment of the present invention. In one embodiment the system on a chip 100 having a controller 102 and a set of processing elements 105, in which each processing element includes a processor and associated hardware elements. In one embodiment each pair of processing elements has a shared memory (SM) and each processor has access to a local L1 cache. The processing elements 105 operate in parallel and the total number of processing elements 105 may be selected based on processing requirements. The shared memory and L1 cache provides local memory to the pair of processors. In one embodiment higher level cache memory (e.g., L2) is shared between processors. Additional access to external (off-chip) memory 150, such as DRAM memory, is also supported. Other fixed function and programmable units 130 may be included on chip to form a complete graphics processing unit (GPU) or an image processor.

The processing pipeline has different stages of processing and associated compute kernels. Embodiments of the present invention include one or more of a set of techniques to reduce a need for kernels to access external memory. Software support is provided to fuse kernels, resize work groups, and interleave kernels. In one embodiment the software support includes a driver 120 and a compiler 125.

Figure 2:
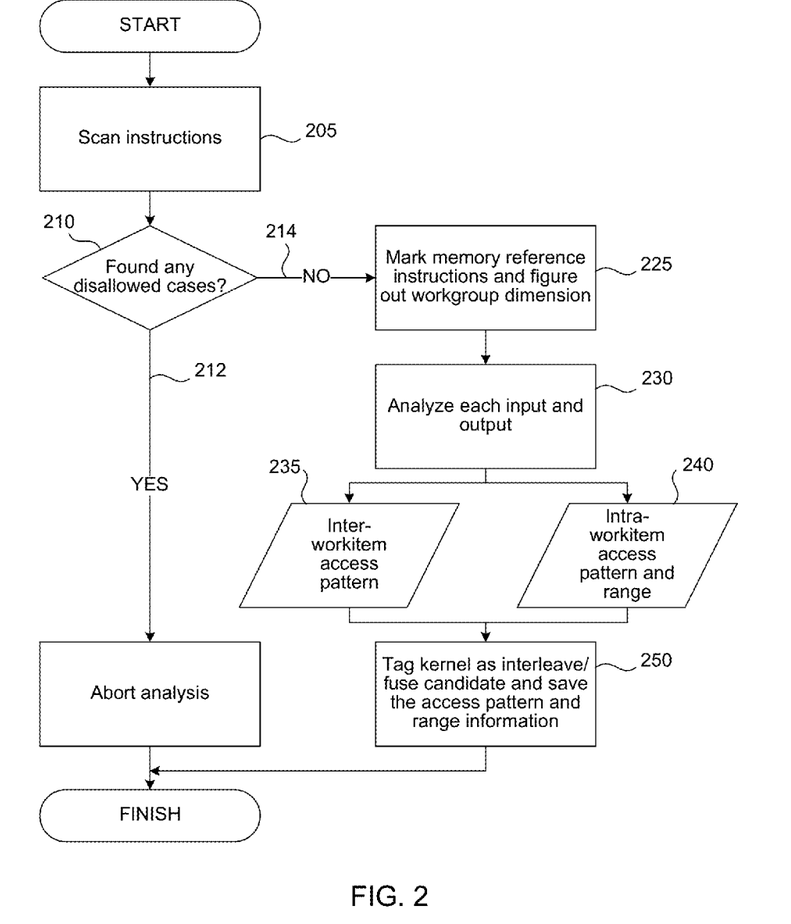
FIG. 2 illustrates a method for a compiler to aid in generating an analysis of kernels that are candidates to be fused or interleaved in accordance with an embodiment of the present invention.

FIG. 2 is a flowchart illustrating actions occurring at a compiler in accordance with an embodiment of the present invention. In one embodiment the compiler analyzes the address-only version of the kernel to determine if it is a candidate for interleaving or fusing with other kernels. The compiler scans instructions 205 of kernels to analyze the kernels and categorizes whether or not they are candidates for interleaving or fusing. In one embodiment a check is performed for disallowed cases 210. For example, all instructions, not related to input and output address, generation are eliminated from further analysis. Additionally dead code is eliminated. The analysis is aborted if there are disallowed cases.

If there are no disallowed cases, 214 then a set of conditions are checked on the resulting code. If all of the conditions pass, the kernel is categorized as an interleave/fuse candidate. In one embodiment memory reference instructions are marked and workgroup dimensions are determined 225. The inputs and outputs are analyzed 230. For example, a check can be performed whether the input and output addresses depend on a local ID or a group ID. The inter-work item access pattern is analyzed 235. The intra-work item access pattern and range is analyzed 240. The kernel is then tagged 250 as an interleave or fusion candidate and the access pattern and range information is saved. In one embodiment the checks include a check to determine that there are no dependencies on variables unknown at compile time that will not be the same for all threads executed by the kernel in one dispatch; a check that there are no barriers in the address-only version of the kernel; and a check that addresses fall into a limited range, defined so that data can be maintained in cache for a two dimensional tile of threads. The limited range does not have to be a continuous range. For example, the limited range might be several noncontiguous ranges.

Figure 3:
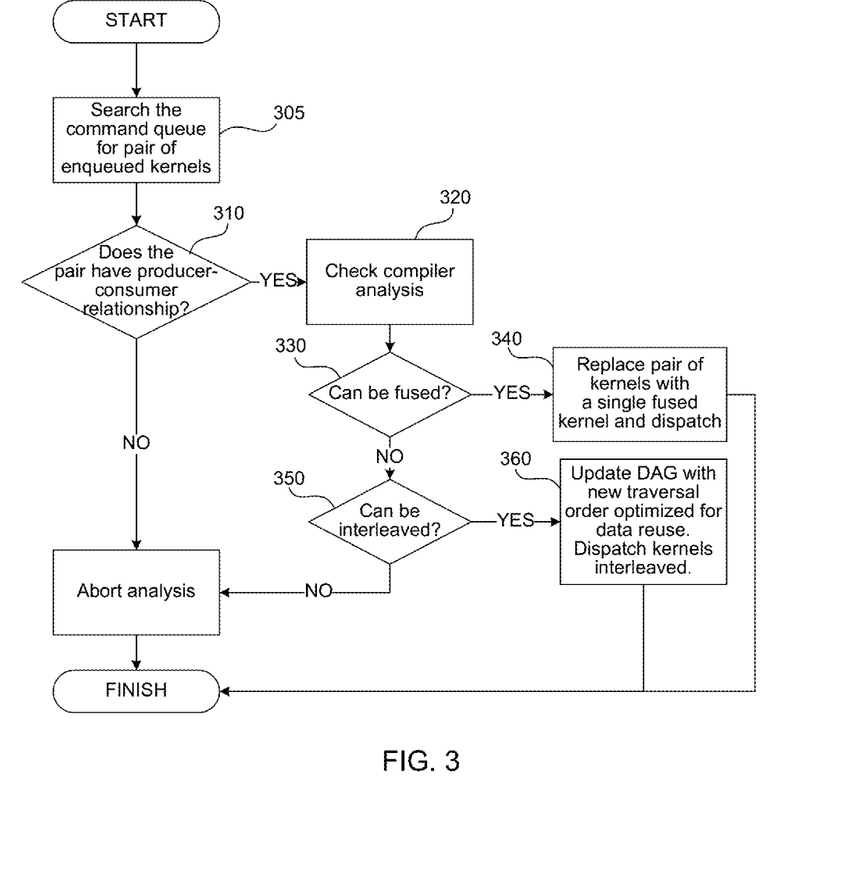
FIG. 3 illustrates a method of using a driver to fuse or interleave kernels in accordance with an embodiment of the present invention.

FIG. 3 is a flowchart illustrating actions occurring in a driver in accordance with an embodiment of the present invention. A command queue is searched 305 for pairs of enqueued kernels and a determination is made whether the paired kernels can be fused or interleaved. In one embodiment an initial check 310 is performed to determine whether the pair of kernels has a producer-consumer relationship. If there is a produce-consumer relationship, the compiler analysis is checked 320. These checks include checking whether the pair of kernels can be fused 330. If so, the pair of kernels is replaced with a single fused kernel 340 and the single fused kernel is dispatched. If the pair of kernels cannot be fused, a check is made whether the pair of kernels can be interleaved 350. The kernels that are fused will often by kernels that are uniquely dependent. The kernel fusion process may be further optimized to aid in maintaining intermediate data on chip, preferably in processor local memory (e.g., L1 cache or shared memory). In one embodiment the fusion of two or more producer and consumer kernels into a single kernel is selected so that intermediate data is passed through processor-local memory (shared memory, registers, or L1 cache) or in some cases L2 cache. In one embodiment in order to maintain intermediate data in processor-local memory, small portions of the image (tiles) are run through all processing stages in the fused version.

In one embodiment the driver computes a directed acyclic graph (DAG) for related compute kernels. The DAG describes the producer-consumer relationships between kernels, including the dependencies between kernels. The dependency may be a simple direct dependency between two kernels, such as kernel A being dependent on kernel B. More generally the DAG may include more complex dependency relationships between more than two kernels. In one embodiment a kernel dependency graph is constructed that defines the producer/consumer relationships between a series of compute kernels. Dependent kernels are matched. In one embodiment the DAG is constructed by examining the buffers used for inputs and outputs of a collection of kernels. In one embodiment a producer kernel writes to one output buffer of an image. A consumer kernel reads from the same buffer, although more generally the consumer kernel might read from multiple images each of which might be generated by a different producer kernel. Kernels that read the output of another kernel or write output read by another kernel are included in the DAG. In one embodiment this is determined by matching up surface base addresses, which in the OpenCL™ language corresponds to the matching of buffers.

In one embodiment the driver dispatches sets of tiles for processing by all or a subset of the kernels in the DAG in an interleaved fashion. In a sequence of kernel operations, some of the data is intermediate data in that the data is used by another kernel in the dependency graph to generate a final result. In one embodiment the interleaving of the dispatches of the tiles is selected to produce intermediate data in processor local memory for the next dispatch to read. That is, the interleaving is selected for the intermediate data to be maintained on-chip. A final result (e.g., a final image) from a series of kernels may be written to external memory.

In one embodiment the driver redefines workgroup dimensions to match nodes for selected edges of the DAG. For pair of nodes, the driver redefines the workgroup dimensions so that the input of the consumer kernel is a sliding window where at any point in time the intermediate data required to process at least one unit of work (e.g., a warp of 32 threads) fits in L1 cache or shared memory. The dimensions of the producer kernel are matched to the dimensions of the consumer kernel.

In one embodiment the driver further selects a workgroup size that optimizes traversal through the input data for the first kernel in the dependency chain. The traversal may take the form of a sliding window. The workgroup may be sized to cover as large a region of the input image as possible so that the output of each workgroup will fit in on-chip memory, such as L1 cache, shared memory, or level 2 cache. This can include selecting enough warps to cover the latency. For more complex dependencies, such as two or more dependent kernels, the workgroup may be matched for output and input regions by redefining workgroup dimensions.

In one embodiment, the workgroup size and interleaving is selected to, as far as possible, keep intermediate data generated by a Kernel A in the processor local memory of the LI cache and shared memory. A Kernel B preferably reads data from the processor local memory, which requires assigning workgroups to specific processors. Assigning workgroups to specific processors maximizes reuse of intermediate data in processor local data. Additionally breaking large dispatches into multiple parts may be selected so that each smaller dispatch executes one workgroup per processor to leave intermediate data that is read by a small dispatch of another consumer kernel.

In one embodiment the driver redefines and resizes workgroup dimensions so that the output of one workgroup of the producer kernel matches the input required for a workgroup of the consumer kernel. In one embodiment it is performed so that the processing order is controlled to the degree needed to efficiently pass intermediate data between the producer and consumer kernels using processor-local memory. As an illustrative example, rather than having a thread process a single pixel, a thread might process every Nth pixel in a two dimensional region and the whole work group would process a large region—for example, a column of width M—on a single processor in a controlled order and maintaining all intermediate data in the processor's local memory. Additionally, another option is to subdivide the work sufficiently to load all available processors for good load balancing.

In one embodiment the driver redefines workgroup dimensions to match nodes for selected edges of the DAG. For a pair of nodes, the driver redefines the workgroup dimensions so that the input of the consumer kernel is a sliding window where at any point in time the intermediate data required to process at least one warp fits in L1 cache or shared memory. The dimensions of the producer kernel are matched to the dimensions of the consumer kernel. The workgroup for the consumer kernel is defined so that it generates a two dimensional slice of output. In one embodiment the code is modified to logically loop through every Nth data element in the slice in order to control traversal through the data in the slice. In one embodiment a default slice dimension is one warp wide (e.g., 32 pixels in one embodiment) and 1/Mth of a column high, where M is selected in order to subdivide the image into enough slices to fully load all processors.

In one embodiment traversal with a sliding window is accomplished by modifying the kernels to process multiple inputs as opposed to just one. Moving from one input to the next has the effect of moving a window on the input data across the image in a controlled way. For example, in a traversal scheme suppose each thread process 1 pixel from every 8th row. So thread 0 would process pixel (0, 0), (8, 0), (16, 0) all the way down a vertical strip of the input image. This provides software control of how pixel processing is assigned to a particular processor and the precise order of processing In one embodiment an image is divided into strips and assigned to different processors, operating in parallel on different parts of the image. Very often, adjacent strips will share input data at the boundaries. Local synchronization of adjacent workgroups executing on adjacent processor may be provided to synchronize adjacent processors so that, when one processor reads the shared data, the other processor will use it soon afterwards, while it is still in cache. In one embodiment a workgroup maintains a "position" variable in memory, to be examined by the adjacent workgroup, which will effectively stall processing until the position reaches some threshold. Additionally, hardware support may be provided and put individual units of work to sleep for a selected number of cycles or an event occurs.

Figure 4:
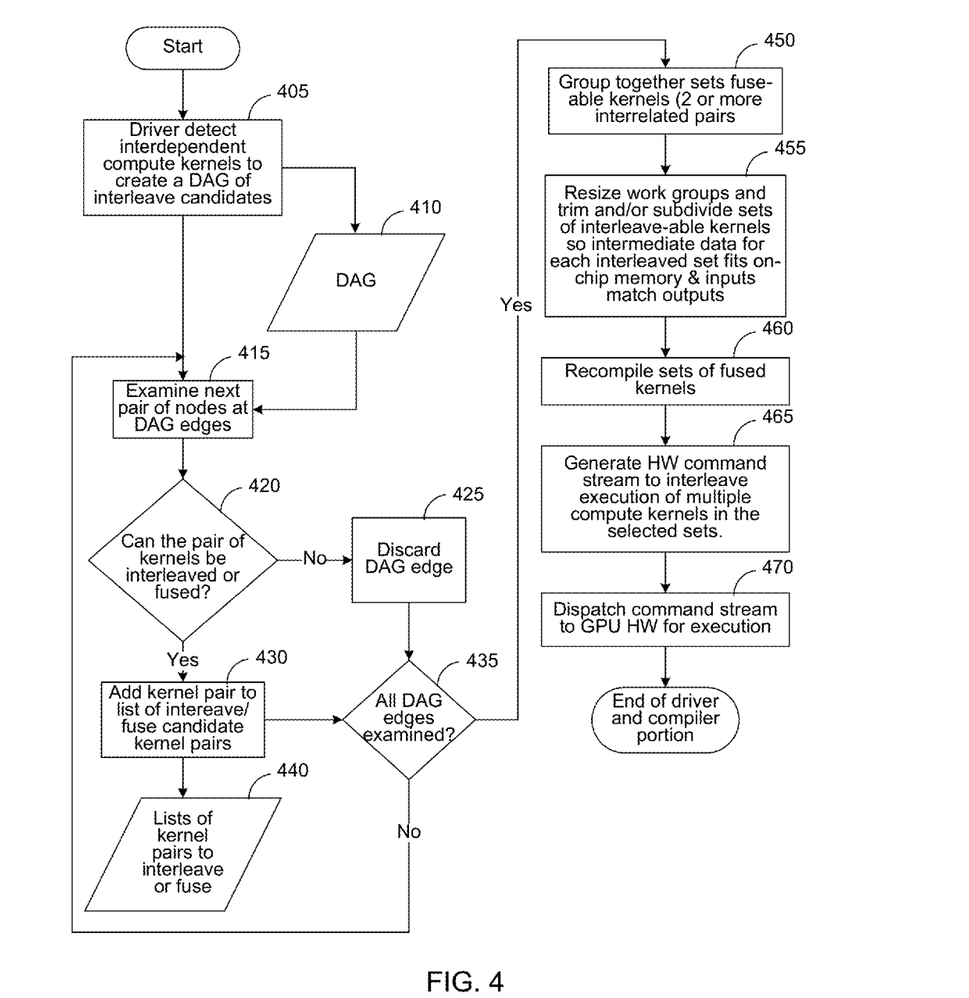
FIG. 4 illustrates aspects of a driver using a DAG to aid in fusing or interleaving kernels in accordance with an embodiment of the present invention.

FIG. 4 is a flowchart illustrating additional details of the use of the DAG in accordance with an embodiment of the present invention. In block 405 the driver detects interdependent compute kernels to create a DAG 410 of interleave candidates. In block 415 the process moves on to examine the next pair of nodes at DAG edges. In block 420 a determination is made whether the pair of kernels can be interleaved or fused. If not, the DAG edge is discarded 425. If the pair can be interleaved or fused, the kernel pair is added 430 to a list of candidates of kernel pairs for interleaving or fusion to generate lists 440 of kernel pairs to interleave or fuse. The initial generation of examining pairs of nodes at DAG edges continues until all DAG edges are examined 435. Sets of kernels that can be fused are grouped together 450, where these include two or more interrelated pairs. In one embodiment Sets of kernels that are fused together include two or more producer and consumer kernels into a single kernel where intermediate data is passed through processor-local memory (shared memory, registers, or L1 cache) or in some cases L2 cache.

In one embodiment additional optimization may optionally be performed for sets of interleavable pairs of kernels so that intermediate data for an interleaved set is optimized to the capabilities of the on chip memory. In one embodiment this optimization may include resizing work groups, trimming, and/or subdividing sets of interleavable kernels 455 so that intermediate data for each interleaved set fit in on-chip memory and the inputs match the outputs. In contrast, if the optimization is not done then it increases the likelihood that intermediate data for interleaved kernels may require access to off chip memory. Sets of fused kernels are recompiled 460. A hardware command stream is generated to interleave execution of compute kernels in the selected sets 465. A command stream is dispatched 470 to GPU hardware for execution.

In one embodiment the kernels are interleaved via an interleaved set of dispatch calls having at least two rounds of dispatch calls to perform at least two stages of processing on a tile basis in which intermediate data remains in L1 cache or shared memory. For example, in the simplest case the first dispatch call launches workgroups on all processors to do a first stage of processing on a first set of tiles. A subsequent dispatch does another stage of processing on the same tiles. Intermediate data is passed through L1 cache or shared memory. In one embodiment the hardware assigns specific workgroups to specific processors using a particular shared memory or L1 cache. The interleaving can be extended to more general cases besides a simple producer-consumer dependency.

Work may be dispatched in an interleaved fashion in several different ways. One way is to have fused producer and consumer tiles to effect the interleaving. Another way is to issue a dispatch of N tiles of a producer kernel and then dispatch M tiles of a consuming kernel. In this example, the consumer's kernel's input data would have been generated by the previous dispatch of the producer kernel and where most or all of this data is in processor local memory. Dispatches of kernels sharing intermediate results are mapped to the same processor.

The interleaving of dispatches of multiple kernels is performed so that data from a producer kernel is left in L1 cache or shared memory and read in the next dispatch by a consumer kernel. In one embodiment, one workgroup is launched per processor. Intermediate results are left in shared memory, L1 cache, or L2 cache. The subsequent launch of a second kernel reads input data from shared memory or cache. All of the workgroups are looped through in an interleaved order. For example, consider an example with sixteen processors, with shared memory and L1 cache.

In a first dispatch of Kernel A, sixteen workgroups are launched whose output fits in the shared memory of L1 cache. A second dispatch of Kernel B launches sixteen workgroups whose input comes from the SM or L1 cache. The process may in principle be continued, for example, such as having the output of Kernel B feed into a Kernel C. In one embodiment hardware support is provided to support assignment of specific workgroups to specific processing elements. That is, the hardware supports dispatching of consumer workgroups to the specific processors that generated the matching producer kernel output. This way intermediate data is passed through processor local memory.

Figure 5:
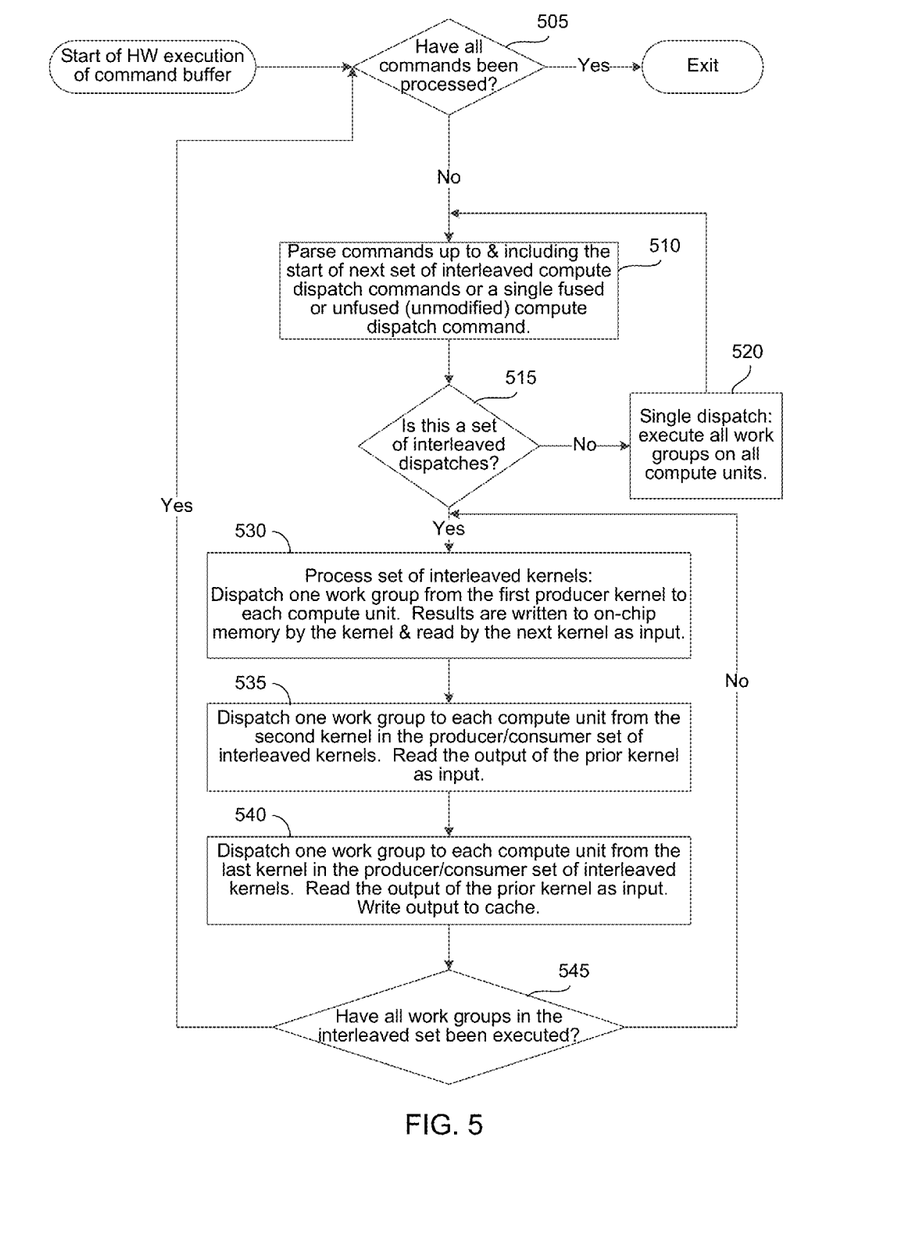
FIG. 5 illustrates hardware execution of commands in accordance with an embodiment of the present invention.

FIG. 5 illustrates aspects of hardware execution in accordance with an embodiment of the present invention. A determination is made whether all commands have been processed 505. If there are commands to be processed, the commands are parsed 510 up to and including the start of the next set of interleaved compute dispatch commands or a single fused or unfused compute dispatch command. A determination is made in block 515 whether this is a set of interleaved dispatches. If not, a single dispatch is performed to execute all work groups on all compute units. If the commands are for a set of interleaved dispatches, then the set of interleaved kernels is processed 530. One work group is dispatched from the first producer kernel to each compute unit. Results are written to on-chip memory by the kernel and read by the next kernel as input. One work group is dispatched 535 to each compute unit from the second kernel in the producer/consumer set of interleaved kernels. The output of the prior kernel is read as input. One work group is dispatched 540 to each compute unit from the last kernel in the producer/consumer set of interleaved kernels. The output of the prior kernel is read as input. The output is written to the cache. A check is then made 545 whether all work groups in the interleaved set have been executed.

In one embodiment the hardware supports directed assignment of workgroups to processing elements. This enables workgroups in interleaved dispatches to be mapped to the processor having its needed input data. In one embodiment the hardware supports global barriers. In order to minimize refetch of data shared between adjacent workgroups, global barriers keep the processing of workgroups in loose synchronization. This way, when one workgroup brings in input data also required for one more other workgroups executing in parallel, the data can be kept in cache until all workgroups have consumed it. Alternatively, semaphore or signals could be used to indicate when the data can be overwritten by another workgroup.

Figure 6:
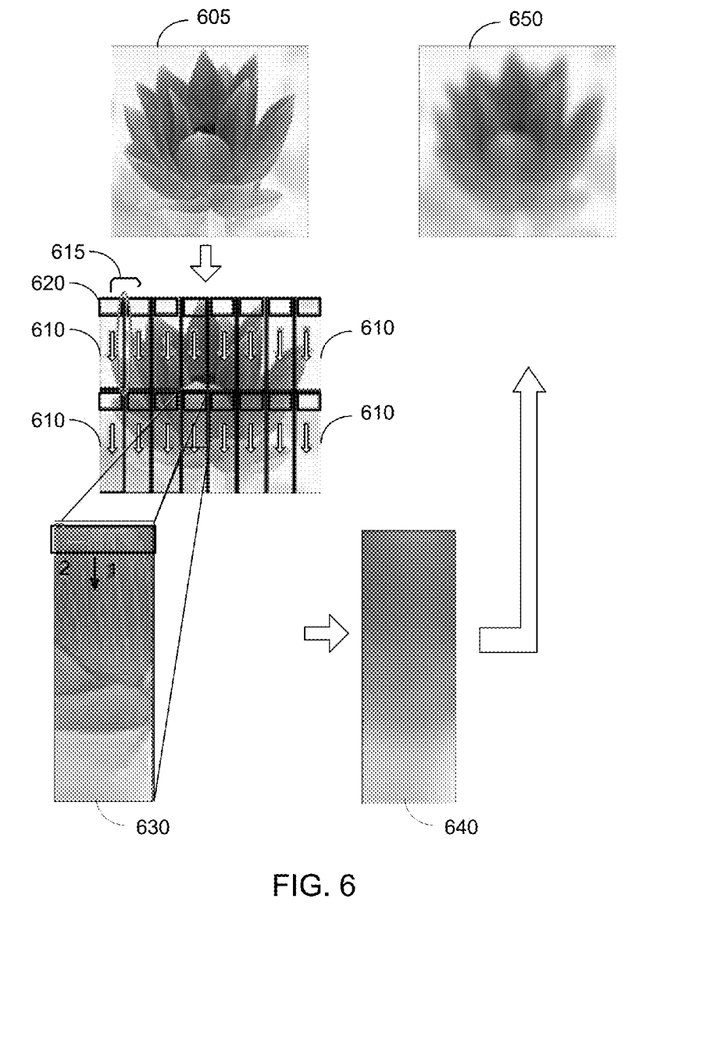
FIG. 6 illustrates a Gaussian blur process in accordance with an embodiment of the present invention.

FIG. 6 illustrates an example of a Gaussian blur process in accordance with an embodiment of the present invention. In one embodiment an image 605 is divided into column-shaped strips 610 and strips are assigned to different processors operating in parallel on different parts of the image. Workgroups are assigned to each column or partial column. Each workgroup moves down the column in a sliding window fashion. Each thread in the workgroup processes N pixels to control movement across the column so that input data is read just once. Expanded view 630 shows an expanded view of an individual strip having a horizontal filter 1 being applied and a vertical filter 2. In this example, a horizontal filter 1 is run for the Nth row and then a vertical filter 2 is run across the width of a column to produce a vertically filtered row. For each new horizontally filtered row, the vertical filter is applied directly after. The workgroups moves down the column to perform the filtering the top to the bottom of an individual strip to result in the filtered strip 640 used to generate the filtered image 650.

Adjacent strips will often share input data at their boundaries. Input data is shared between workgroups of adjacent strips 610. Arrow 615 illustrates synchronization is provided between workgroups of adjacent strips. Ellipse 620 illustrates a region where input data is shared between workgroups in the region proximate the border between the strips. Consequently, there is potential efficiency improvement in loosely synchronizing adjacent processors so that when one processor reads the shared data the other adjacent processor will use the same data afterwards while the data is still in on-chip cache. In one embodiment a global synchronization mechanism is provided in which processors poll a semaphore to know when to wake up and continue.

The traversal of data with a sliding window may be performed in various ways. In one embodiment the kernels are modified to process multiple inputs as opposed to just one. Moving from one input to the next has the effect of moving the window on the input data in a controlled way. As an illustrative example of a traversal scheme suppose each thread processes 1 pixel from every 8th row. So thread 0 would process pixel (0, 0), (8, 0), (16, 0) all the way down a vertical strip of the input image. This provides control from software of how pixel processing is assigned to which processor or the precise order they're processed.

In the general case, an optimum traversal scheme may be based on variables such as the number of processor elements; size of on-chip memory, including shared memory and level 1 and level 2 cache memory; image width, image height, and bytes per pixel of the image; an input filter width and height. Additionally, the traversal scheme will depend on aspects of the image processing. Generalized traversal schemes can be generated for generalized traversal of certain category of image processing such as cases having 1 or 2 dependent kernels; reading in a localized region of the image and generating a transformed image for that region; and writing to each output pixel just once.

Consider an example in which there are sixteen processors. Consider an image 1280 pixels×720 pixels with 16 bytes per pixel. Suppose each set of two processing elements has their own 32 KB shared memory and a 32 KB L1 cache. One option is to divide the image into 16 columns each generating an output 80 pixels wide by 720 pixels high. The work group is 256 elements and each element is composed of 1800 pixels (80×720/32). A warp works on a 16×2 area of the image when running horizontally and 2×16 when running vertically and 8 warps process a 16×16 block.

In one embodiment processing of one 80-pixel column includes bringing in sixteen pixels to the left and 80 pixels (6*16 pixels) to the right of the left edge of the column. The filter is run for one 16-high row with 5 blocks per row. In one embodiment a horizontal filtering process utilized the left-most block in the row to perform filtering, thus kicking it out (that is, a 16×16 block is used to horizontally filter the left-most block in the row).

Figure 7:
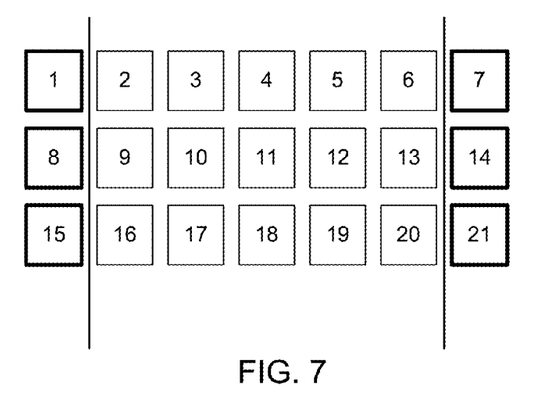
FIGS. 7-8 illustrate aspects of traversing data blocks in a filtering process accordance with an embodiment of the present invention.

FIG. 7 illustrates 16×16 blocks of data corresponding to blocks 1-21. The blocks with a solid black outline (blocks 1, 7, 8, 14, 15, and 21) are 16×16 blocks of input data. The middle portion corresponds to horizontally filtered 16×16 blocks of data (blocks 2, 3, 4, 5, 6, 9, 10, 11, 12, 13, 16, 17, 18, 19, 20). The filter is run vertically from left to right to generate five 16×16 blocks of data and then write these blocks to L2 cache memory. With each 16×16 block of filtered pixels, a load can be performed in a new 16×16 input block at the bottom row.

Figure 8:
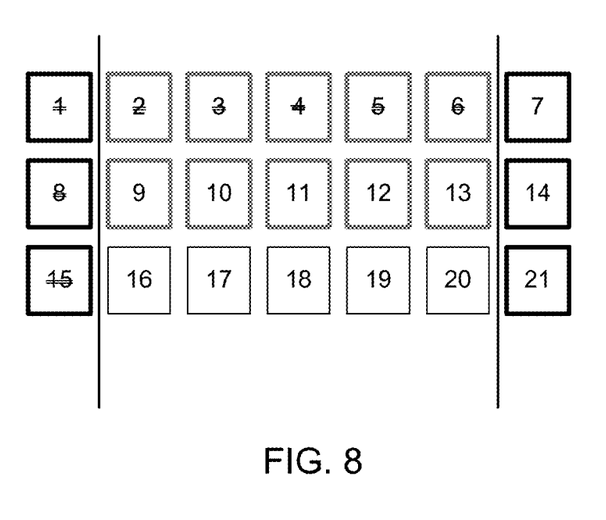

FIG. 8 illustrates the evolution of the processing of the blocks in accordance with an embodiment of the present invention. The double strikes in blocks 1, 2, 3, 4, 5, 6, 8, and 15 means the data is no longer needed for that 16×16 block. Blocks 2, 3, 4, 5, 6, 9, 10, 11, 12, and 13 are vertically filtered and horizontally filtered. Within a column there is a need to have storage for 2 rows of seven 16×16 blocks. The maximum storage needed at any one time is fifteen 16×16 blocks. A new row of input 16×16 blocks is then brought in, horizontal filtering is performed of the middle 5 blocks, followed by vertically filtering the blocks in the row above, and then evicting the row above that. Looping is performed until the whole column is processed. In order to avoid refetching the 16×16 blocks at the boundaries of the column, the work groups should be kept in lock-step through global barriers.

Figure 9:
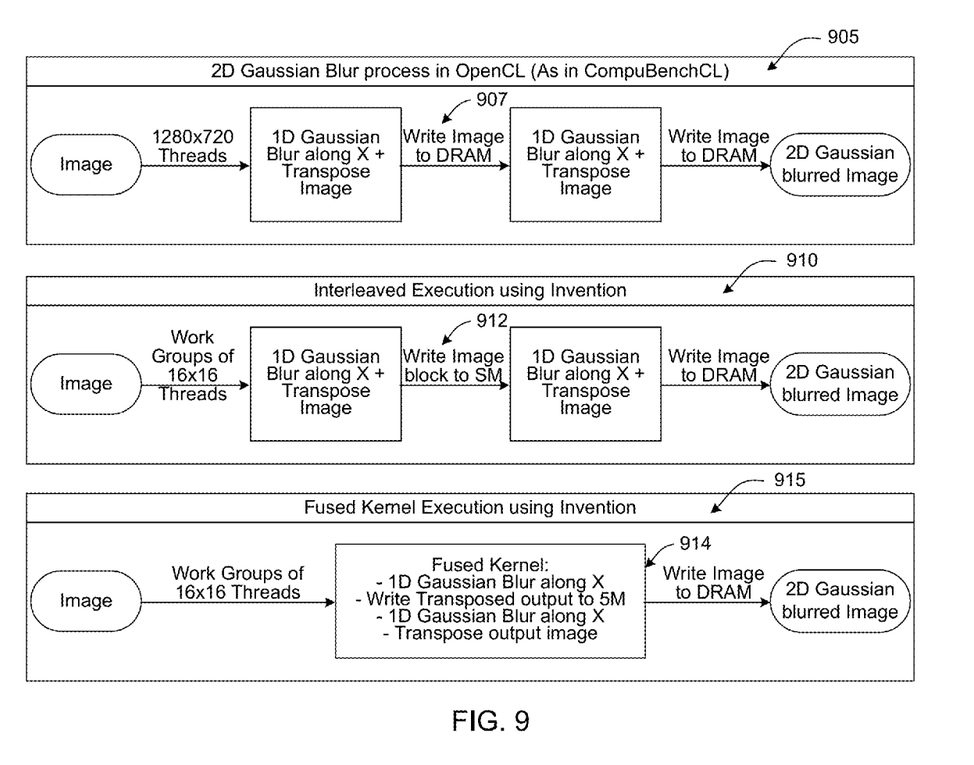
FIG. 9 illustrates a comparison of conventional Gaussian filtering with fusing and interleaving in accordance with an embodiment of the present invention.

FIG. 9 illustrates a comparison of Gaussian blur techniques. As illustrated in process 905, conventionally a Gaussian blur process might work on all of the threads of the image or 1280×720 threads, and require writing intermediate data to external memory (DRAM) 907. In contrast in an interleaved process the work groups of smaller numbers of threads, such as 16×16 threads, are interleaved to write intermediate data to the processor local memory (e.g., shared memory) 912. Similarly, in one embodiment a fused kernel process 915 writes intermediate data to processor local memory 914 and eliminates a need to write intermediate data to external memory.

One application of the present invention is in mobile devices where power consumption is a consideration. Reducing data traffic for a set of related kernels reduces the energy required. Moreover, in some applications there is a performance improvement where the combination of kernels is data-bound and when a particular kernel is data-bound, both by reducing the data traffic overall and by rescheduling work to mix compute and data bound kernels in a more fine-grained way so as to load balance the overall workload better and thus improve performance.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of performing a pipelined process utilizing compute kernels to perform stages of processing in a processing unit having a plurality of processors, an on-chip memory, and access to an external memory, comprising:
    identifying dependencies between producer kernels and consumer kernels in a command queue; and
    generating an interleaved set of dispatch calls for at least one set of interdependent kernels in the command queue in which intermediate data results are maintained in the on-chip memory.

2. The method of claim 1, wherein identifying dependencies comprises determining whether a set of kernels has a producer-consumer relationship.

3. The method of claim 1, wherein identifying dependencies comprises analyzing dependencies of input and output addresses of candidate kernels.

4. The method of claim 3, wherein identifying dependencies comprises generating a kernel dependency graph defining a relationship between producer kernels and consumer kernels.

5. The method of claim 1, further comprising redefining work groups associated with at least two kernels to match inputs and outputs of dependent kernels.

6. The method of claim 5, wherein the redefining is further selected to maintain intermediate data results in the on-chip memory.

7. The method of claim 6, further comprising selecting a traversal order to maintain intermediate data results in the on-chip memory.

8. The method of claim 1, wherein an image is divided into adjacent strips and each strip assigned to a different processor and the method further comprises synchronizing data reuse with an adjacent workgroup.

9. The method of claim 1, further comprising identifying kernels that can be fused and generating dispatch calls for fused kernels.

10. The method of claim 1, further comprising scanning code instructions, analyzing access patterns and range information, and tagging kernels as candidates for interleaving or fusing.

11. A method of performing a pipelined process utilizing compute kernels to perform stages of processing in a processing unit having a plurality of processors, an on-chip memory, and access to an external memory, comprising:
    identifying dependencies between producer kernels and consumer kernels;
    determining if pairs of kernels can be interleaved or fused;
    replacing at least two kernels with a fused kernel and dispatching the fused kernel; and
    generating an interleaved set of dispatch calls for at least one set of interdependent kernels in which intermediate data results are maintained in the on-chip memory.

12. The method of claim 11, wherein identifying dependencies comprises generating a kernel dependency graph defining a relationship between producer kernels and consumer kernels.

13. The method of claim 11, further comprising redefining work groups associated with at least two kernels to match inputs and outputs of dependent kernels.

14. The method of claim 13, wherein the redefining is further selected to maintain intermediate data results in the on-chip memory.

15. The method of claim 14, further comprising selecting a traversal order to maintain intermediate data results in the on-chip memory.

16. The method of claim 11, wherein an image is divided into adjacent strips and each strip assigned to a different processor and the method further comprises synchronizing data reuse with an adjacent workgroup.

17. A system, comprising:
    a graphics processing unit having a plurality of processors and an on-chip memory; and a driver and a compiler adapted to:
identify dependencies between producer kernels and consumer kernels associated with a graphics application;
determine if pairs of kernels can be interleaved or fused;
replace at least two kernels with a fused kernel and dispatch the fused kernel; and
generate an interleaved set of dispatch calls for at least one set of interdependent kernels in which intermediate data results are maintained in the on-chip memory.

18. The system of claim 17, wherein the system is configured to redefine work groups associated with at least two kernels to match inputs and outputs of dependent kernels and maintain intermediate data results in on-chip memory.

* * * * *